United States Patent Office 3,292,785
Patented Dec. 20, 1966

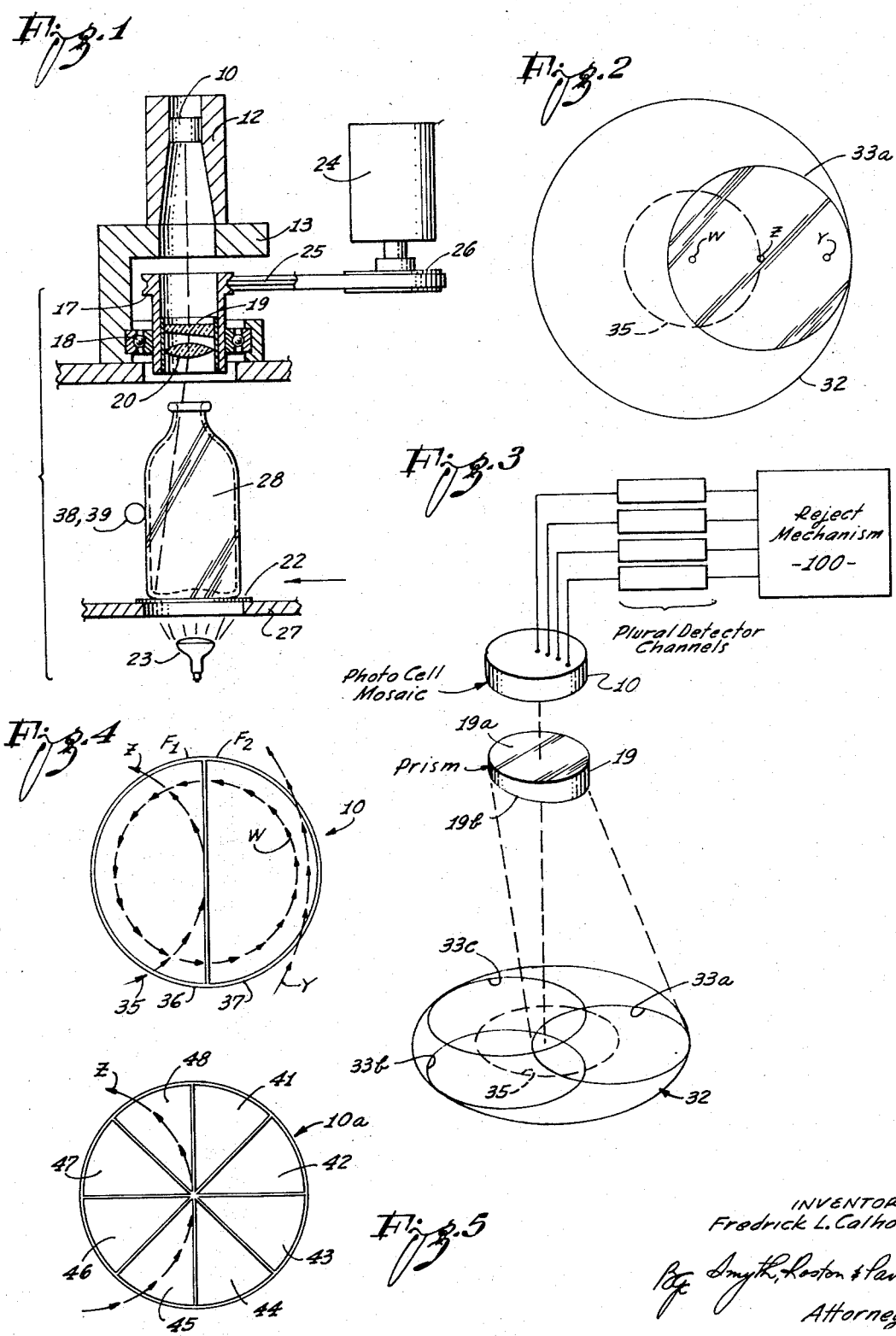

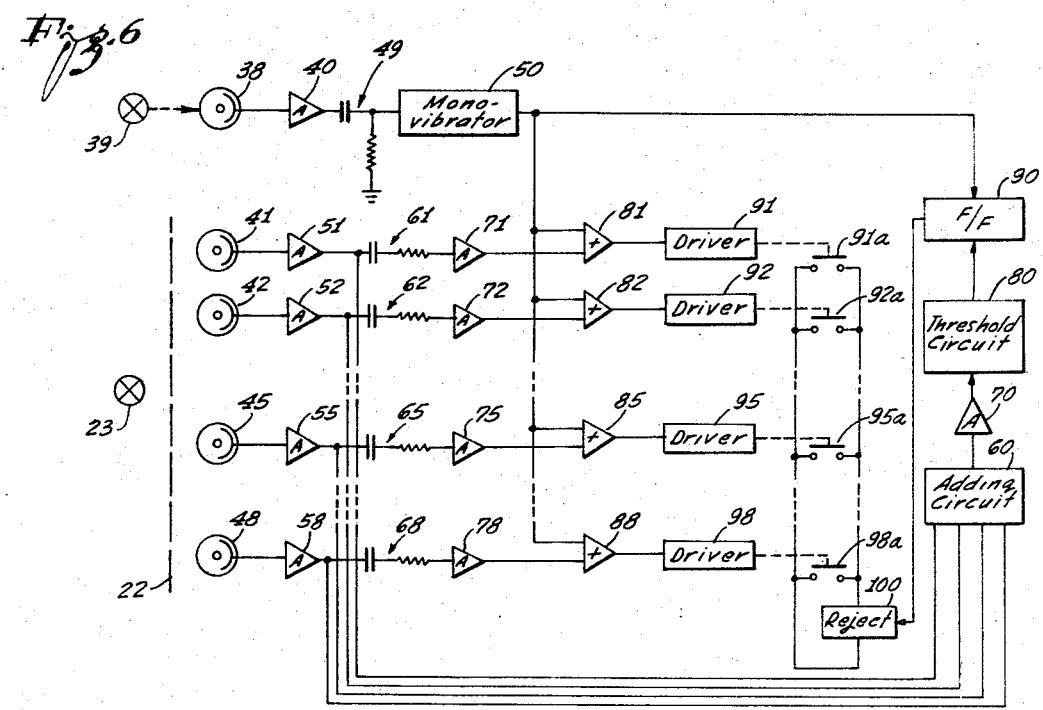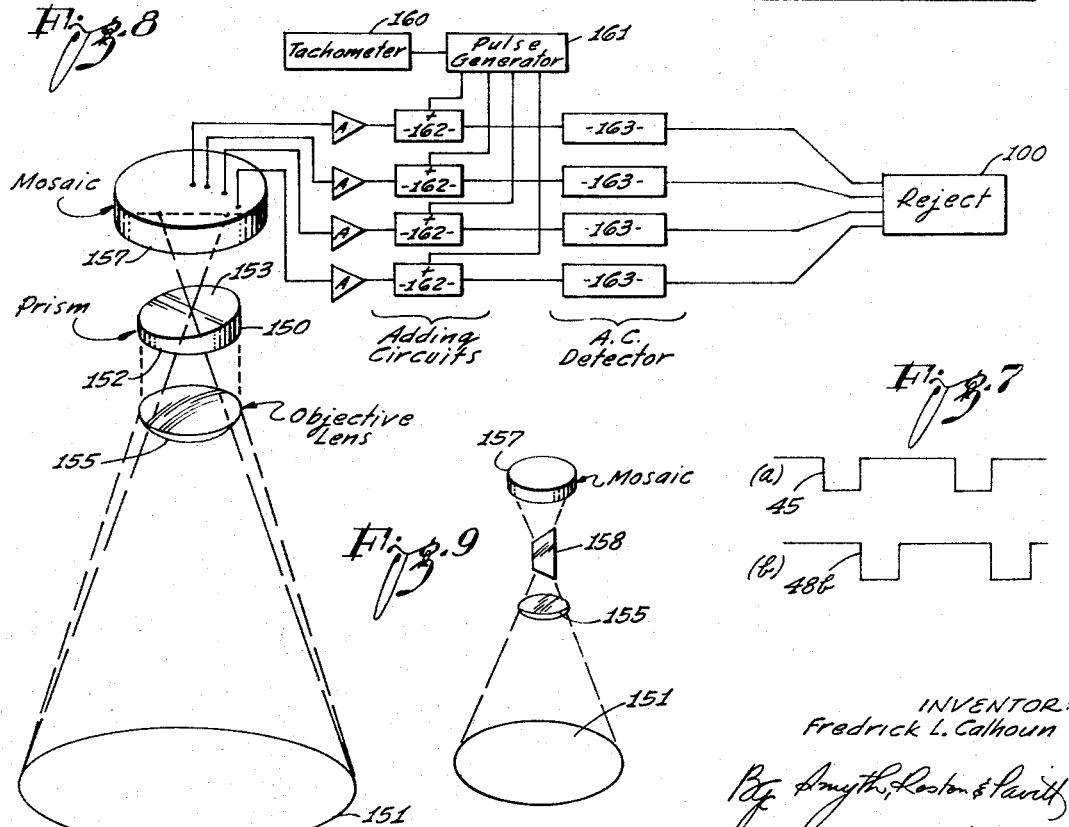

3,292,785
BOTTLE INSPECTION SYSTEM
Frederick L. Calhoun, Torrance, Calif., assignor to Geo. J. Meyer Manufacturing Co., Cudahy, Wis., a corporation of Wisconsin
Filed Aug. 27, 1964, Ser. No. 392,499
12 Claims. (Cl. 209—111.7)

This invention relates to an apparatus for inspecting containers, such as bottles, for cleanliness.

When bottles or other, preferably, transparent, devices are photoelectrically scanned, small particles of foreign matter are generally difficult to detect. Systems are known employing a rotating reticle, or light chopper, as part of a photoelectric scanning means to facilitate the detection of small foreign particles. The reticle intercepts the light from the illuminated bottle to a photocell, which also forms part of the photoelectric scanning means. The reticle is made up of alternate opaque and transparent areas which are successively interposed between any foreign particles in the bottle and the photocell. The electrical output of the photocell, accordingly, is an alternating signal having a frequency related to the rotating speed of the reticle and the number of alternate opaque and transparent areas of the reticle. If foreign particles are not present in the bottle, the output of the photocell is substantially direct current.

Such an inspection system, though generally satisfactory, has a number of limitations with respect to the sensitivity of the photoelectric scanning means. First, the sensitivity varies across the scanning field, being lowest at the center of the rotating reticle; and second, the overall sensitivity of the scanning means is low because the particle blocks only a small part of the light from the bottle through the reticle. One-half of the available light is transmitted through the reticle because a number of transparent sectors are required to a signal suitable for processing.

In United States Letters Patent 3,081,666, the variations of scanning sensitivity across the field are reduced by utilizing a lens system for successively coupling different areas of the total field to the reticle. Low-sensitivity regions are avoided, but the overall sensitivity is low because of the 50 percent transmission by the reticle.

The observation field, such as the bottom of a bottle, is imaged upon at least a portion of a mosaic of photocells; and means are provided to sequentially pass this image, for example, by means of a rotating prism, across the photocell mosaic which includes a plurality of spaced-apart photocells. The sensitive areas of all the photocells together form an area at least as large as the cross-sectional area of the beam from the prism; but the bottle-bottom image portion, as momentarily monitored by each photocell, at any instant covers a limited area which is rather small as compared with the overall size of the entire observation area, so that a foreign particle within such a limited area modulates rather strongly the brightness as observed by such a photocell.

The principal feature of this invention relates to the utilization of individual detector channels respectively connected to the photocells forming the mosaic, so that signal changes picked up by any one photocell are processed separately and are effective by parallel operation only. Thus, each photocell monitors limited progressive areas, and the resulting passage of the image of a foreign particle, if any, is registered by the detector channel governed by the photocell and producing a signal accordingly. If, during the inspection period and the progressive monitoring of bottle-bottom portions, a dirt particle influences more than one photocell, each respectively associated channel will produce a separate signal, and such separate signals are being produced sequentially.

A further feature of the invention includes provision for a control means that is connected to be responsive in parallel to the signals from all the detector channels, but it responds only to the first detector signal out of a plurality of sequential signals as resulting from a single dirt particle.

The advantage of this system is to be seen in that each detector channel and the possible response of the container reject control are influenced by a low "noise" level, resulting only from a limited bottle area as it is inspected at any instant by a single photocell. For processing of each photocell output, the passage of the image of a dirt particle into and out of the range of any individual photocell is primarily responsive to the production of a reject signal. Such passage is not obscured by noise signals produced by any of the other photocells for being on the other detector channel.

Each detector channel preferably is provided with an alternating-current amplifier which is tuned to a frequency related to the speed of the prsim. As the prism rotates, the output of each of the A.C. amplifiers is a series of square pulses having a repetition rate related to the rotating speed of the prism and having a duty cycle indicative of the radial position of the partcle of dirt in the scanning field.

If no dirt particles are present, the output is a D.C. signal because the light impinging on each of the photocells in the mosaic is equal throughout the rotation of the prism.

In the preferred embodiment of this invention, a mosaic of eight photocells is provided, each of which forms part of a separate circuit arrangement. These circuit arrangements constitute individual detector channels for the sampled signals, and they include amplifying means. The first channel which observes a dust particle triggers a reject apparatus. The response of the individual photocells as separately sampled increases the sensitivity of response due to the utilization of smaller photocell areas, so that a very improved signal-to-noise ratio is obtained.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

FIG. 1 is a sectional view through the optical and mechanical portion of the inspection apparatus according to the preferred embodiment of the invention;

FIG. 2 is a functional representation of the total scanning field and the nutation path of the sequentially scanned areas illustrating a number of particles of foreign matter to be detected;

FIG. 3 is a schematic representation of the inspection apparatus of this invention illustrating the relationship between the sequentially sampled areas and the total scanning field;

FIG. 4 is a functional representation of the sensitive surface of one embodiment of the photocell mosaic utilized in the inspection apparatus of this invention and the relative motions of a number of particles of foreign matter in the bottle due to the rotation of a prism in the apparatus;

FIG. 5 is a functional representation of another embodiment of the photocell mosaic utilized in the inspection apparatus of this invention;

FIG. 6 illustrates a block diagram of a circuit network processing the output signals furnished by a mosaic of photocells as illustrated in FIG. 3 or 5;

FIGS. 7a and 7b illustrate plotted curves representative of the electrical signals provided from two photocells when responding to the same particle of foreign matter in a bottle;

FIG. 8 is a schematic representation including a block diagram of another embodiment of this invention where the scanned area includes substantially the entire field of view; and FIG. 9 is a schematic representation of the optical paths of another embodiment of the inspection apparatus of the invention.

Referring first to FIG. 1, a bottle 28 is moved on a conveyor 27 through an inspection zone defined by a source of illumination 23. The light from the source 23 is coupled through a diffusing plate 22 which supports the bottle 28 on the conveyor 27. The plate 22 covers an aperture 27a in conveyor 27 and may, illustratively, be made of opal glass. Plate 22 diffuses the light evenly over the bottom of the bottle 28. The bottle 28, which is transparent, is one of a large number of bottles which may be moved at a rapid and continuous speed through the inspection zone. The inspection rate, illustratively, may be 600 to 700 bottles per minute. Though the inspection rate is, therefore, quite high, each bottle 28 is carefully inspected for small particles of foreign mater or dirt in the bottle.

The illuminated bottom of the bottle 28 forms a light field 32 depicted in FIGS. 2 and 3.

The field 32 represents the total area scanned by a rotating prism 19 during each revolution of the prism 19. The rotating cylindrical prism 19 receives the light from an objective or field lens 20, the optical axis of which coincides with the axis of rotation. The lens 20 focuses the image of the bottom of the bottle 28 on a photocell mosaic 10. The prism 19, shown in FIGS. 1 and 3, has an upper face 19a which extends perpendicularly to its axis of rotation, and it has a lower face 19b which is at an acute angle to this axis of rotation. As the prism 19 rotates, it accordingly couples light from different progressive areas of the entire light field 32. The areas 33a–33c, scanned at different time epochs during the rotation of the prism 19, are illustrated in FIG. 3, and they are smaller than the entire area 32. The successive centers of the scan areas form a nutation circle 35, shown in FIGS. 2, 3, and 4.

Referring again to FIG. 1, it can be seen that a light barrier 38–39 extends transversely to the direction of movement of the conveyor 27; and the light barrier senses when a bottle is in the inspection zone, which actually means that the center of the bottom of bottle 28 passes, or is about to pass, through the axis of rotation of prism 19 and through the optical axis of lens 20. The light barrier is set up by a light beam from a light source 39 (see FIG. 6), which is continuously observed by a photocell 38. A bottle wall, when entering this light beam, interrupts it, and this interruption is registered by the photocell 38 as a decrease in illumination received. As will be explained with reference to FIG. 6, the photocell 38 controls the effectiveness of the light and light modulation received by mosaic 10.

The lens 20 and the prism 19 may both be mounted in a bearing pulley 17, which is rotated in bearings 18 by a belt 25. The lens 20 may also be mounted stationary with respect to the prism 19. An advantage of rotatably mounting the lens 20 with the prism 19 in the pulley 17 is that the lens 20 remains cleaner, and any particle adhering to the lens 20 does not provide for an alternating signal at the photocell mosaic 10.

The bearings 18 are supported in a bearing block 13, which also supports a member 12. The photocell mosaic 10, mentioned above, is supported in the stationary member 12 and is, therefore, stationary with respect to the rotating prism 19. The belt 25, which drives the pulley 17, may in turn be driven by a pulley 26, and the pulley 26 may in turn be rotated by a conventional type motor 24.

Illustratively, the speed of rotation of the prism 19 may be 15,000 revolutions per minute. The high rotating speed is preferred because the bottles 28 are moved quite rapidly through the inspection zone. At such speed, the entire field 32 is scanned after 1/250 second. Normal bottles pass at a rate of 600 to 700 bottles per second, and thus each bottle moves only about 3/100 inch during this inspection period.

The photocell mosaic 10 may include two or more photocells, with FIG. 4 illustrating one embodiment having two photocells 36 and 37, and the mosaic 10a in FIG. 5 illustrating a second embodiment having eight photocells 41 through 48. The photocells 36 and 37 in FIG. 4 have semicircular sensitive areas, and the photocells 41 through 48 have wedge-shaped sensitive areas, to form in both embodiments an effectively contiguous circular sensitive area.

It should be mentioned, however, that the provision of a circular configuration of the entire light-sensitive device is not mandatory. The main requirement is that the momentary observation field, such as 33a, etc., should sweep the entire inspection field 32. All the light from the rotating prism 19 impinges on the contiguous sensitive area of the mosaic. Photocells of these and other different shapes are referred to as contour photocells and are manufactured, for example, by the International Rectifier Company. The contour photocells are effectively variable resistance devices, with the resistance presented by each photocell being determined by the amount of light impinging upon its sensitive surface. In any event, the limited area inspected at any instant by each individual photocell or light-sensitive surface, as well as the entire area covered for inspection by each photocell during rotation of prism 19, is smaller than the entire field 32 to be inspected.

If the bottle is clean, the amount of light furnished to the photocell mosaic 10 is constant throughout the rotation of the prism 19. At any instant, the light from the areas 33a, 33b, 33c, etc., being scanned is the same as from the other areas scanned during the rotation of the prism 19. The outputs of the mosaic 10 or the mosaic 10a are, therefore, D.C. signals for a clean bottle 28, as is further described hereinafter with reference to FIG. 6.

As indicated above, FIG. 3 illustrates the nutation circle 35 followed by the successively scanned areas 33a, 33b, etc., with respect to the total field 32. The diameter of the area scanned at any instant is somewhat larger than the radius of the field 32 so that a particle of dirt at the center of the field 32 is continuously scanned. FIG. 2 illustrates a particle W at the center of the field 32 and also particles Z and Y at two other positions at the bottom of the bottle.

Each of the areas 33a, 33b, etc., includes the particle W, but at different angular positions, because at any instant the area being scanned includes the center of the field 32. FIG. 4 illustrates the apparent movement of the images of the three particles W, Z, and Y across the photocell mosaic 10, including the two photocells 36 and 37. As shown in FIG. 4, the movement of the image of the particle W is a circle concentric with the center of the composite sensitive area of the mosaic 10 and close to the circumference of the circular photosensitive device.

In general, the mosaic 10 employed includes at least two photocells arranged in any manner, for the effective path of the image of the particle W is concentric with the center of the sensitive area of the mosaic 10. If only a single photocell having a circular sensitive area were utilized, the image of the particle W would not provide an A.C. component at the output of the photocell. The D.C. level at the output of such a single photocell would be somewhat reduced by the image of the particle W, but for small particles such a small difference in level would be effectively undetectable. D.C. signals are generally utilized to detect relatively large pieces of foreign matter in the bottle, but D.C. signals are not suitable for detecting small particles. For this reason, therefore, the mosaic 10 includes at least two photocells 36 and 37 to develop an A.C. signal which is suitable for detecting small particles.

Proceeding now to the circuit diagram shown in FIG. 6, there is shown an evaluating circuit network which operates with mosaic 10a as shown in FIG. 5. However, for convenience in illustration, not all of the various channels and photocells are shown, but only four thereof. There are shown four of the eight photocells, 41, 42, 45, and 48. Each of the photocells is connected to a preamplifier, preferably a D.C. type, broad band amplifier. These amplifiers are respectively denoted with reference numerals 51, 52, 55, and 58, and they are respectively connected to the photocells 41 through 48. The output signal of each amplifier represents the light modulation as received and monitored by the respectively associated photocell. The amplifier output signals are individually fed to differentiating networks such as 61, 62, 65, and 68. The purpose of the differentiating circuit is to render the detection of a dirt particle by each and any of the detector channels to some extent independent from the size of the dirt particle and to develop a signal in which the repetition rate due to the image rotation is more fully developed as an A.C. signal.

Whenever the image of a dirt particle enters the range or passes across the sensitive surface of a particular photoelectric receiver, it produces a decrease in brightness. The recurrence of the passage of the image across the photocell due to rotation of prism 19 results in a train of pulses having the rotational speed frequency. The differentiation develops the fundamental of this pulse train.

The amplifiers 71 to 78 have a bandwidth wide enough to accommodate the frequencies produced by photocell mosaic 10a. If the prism 19 is rotated at a speed of 15,000 revolutions per minute, then the fundamental frequency to the amplifiers 71 through 78 is 15,000 divided by 60, or 250 cycles per second. The square waves also include the odd harmonics of the fundamental, and when the mosaic 10a is utilized, fundamental frequencies up to 1000 cycles per second (for the particle W) are present. For the two photocell mosaics 10, the farther the particle is from the center of the field 32, the smaller the pulse width; but the repetition rate is the same, and the fundamental frequency thus remains the same.

If a two-cell mosaic 10 is utilized, the bandwidth of the tuned amplifiers may, for example, be from one-half the fundamental frequency (250 c.p.s.) to twice the fundamental frequency. For the mosaic 10a, the amplifiers 71 to 78 should have a somewhat larger bandwidth, extending from 125 c.p.s. to 2000 c.p.s.

Each of the amplifiers 71 to 78 may include compensating circuitry, not shown, to counteract the variation in power with pulse widths. The magnitude of the pulses provided by the amplifiers 71 to 78 depends essentially on one factor, the size of the detected particle of dirt. The larger the particle, the greater the change in illumination at the photocells 41 through 48—and, therefore, the larger the magnitude of the pulse to the respective amplifiers 71 through 78. The position of the particle does not determine the magnitude of the pulse, but only the length thereof, for the position determines the nutation path of the image of the particle across the photocells. When the image passes from one photocell to another, a pulse of similar amplitude is provided, as compared with the pulse that results when the image passes from the exterior and across an outside edge of a photocell.

The output of each of these tuned circuits 71 through 78 is then fed to gating circuits 81, 82, 85, and 88, respectively. Either the gating circuits or the tuned circuits may include rectifying means, so that the output signal of each gate is a D.C. signal.

Each of these gates 81 through 88 receives additionally a gating signal. It has been mentioned above that each bottle 28, when entering the detecting range of the entire inspection device, passes through a light barrier set up by the lamp 39; and the interruption of the light barrier is monitored by the photoelectric receiver 38, feeding its output accordingly to an amplifier 40, whose output may be differentiated (39) so as to unidirectionally trigger a monovibrator 50. The trailing edge of the pulse appearing when the bottle leaves the barrier is suppressed.

This monovibrator 50 has an oscillation period or a recovery time equal to that required for detection and inspection of each particular bottle. Basically, the recovery time needs to be only as long as necessary for the optical inspection system to sweep once over the bottom of the respective bottle. At the rate given above, this is completed after ½₅₀ second, which, in effect, is the minimum required for complete bottle inspection. The recovery time of the monovibrator 50 should not exceed the period in which the mouth of the bottle may enter and obscure the detection range. It is quite apparent that thus the recovery time of monovibrator 50 defining the inspection period has as its lower limit the particular sweep or scanning or rotational speed of the prism 19, and the upper limit is more or less given by the size and configuration of the bottle. It is quite apparent that a bottle with a large upper opening will to a lesser extent tend to obscure the detecting range and that a bottle with a rather narrow upper opening will have to be inspected in a shorter period of time. If different size bottles are to be inspected by the same system, the recovery time of the monovibrator 50 may be made adjustable.

The output of the monovibrator 50 serves as a gating pulse for each of the amplifiers 81, 82, 85, and 88. At this point, it should be mentioned that it is also possible to use this gating signal for gating the preamplifiers 51 through 58. However, it is inadvisable to introduce such gating signals ahead of the differentiating and the tuned circuits, for otherwise the gating on and gating off would tend to simulate edges and would tend to simulate dirt particles. It is, therefore, advisable to avoid such simulation and to use the gating signals only for governing further passage of the output signals as furnished by the tuned circuits 71 through 78.

The individual output signals of amplifiers 81 through 88 operate relay driver stages 91, 92, 95, and 98, which may include suitable power amplifiers so as to enable the relays to be operated. The relays which are illustrated are electromechanical relays and are to be understood only as symbolical, for reasons of simplification. Of course, electronic relays of conventional design may readily be used and will have to be used in case the inspection speed is so high that power relays are too slow. In any event, there are shown the blades 91a, 92a, 95a, and 98a, which can be construed as symbolizing the opening or closing of circuits that are connected in parallel. Each one of these circuits, as symbolized by the blades 91a through 98a, is capable of causing the reject mechanism 100 to respond, but once a response is present, further blade actuation by a different channel is, in effect, suppressed. The reject mechanism 100 will cause the ejection of a bottle from the conveyor belt in which a dirt particle has been detected.

As the prism 19 in FIGS. 1 and 3 rotates, the light reaching the photocells 41 through 48 is the same, as long as a particle of foreign matter is not present on the bottom of the bottle or container 28. However, let us assume that a particle such as particle Z shown in FIG. 5 is present in the field of view. Since the momentary inspection field is smaller for one or even for all of the photocells as compared with the entire inspection field, this particle Z is not continuously in the range of at least one of the photoelectric cells. Particularly in FIG. 5, it can be seen that the image of particle Z will, at a particular time, enter the range of a photocell 45. Accordingly, a decrease in brightness is observed by a photoelectric receiver 45, as depicted in FIG. 7a. The duration of this pulse 45a is proportional to the time it takes for the image of particle Z to travel across photocell 45. The tuned circuit 75 responds strongly to the fundamental and the lower harmonics of this first pulse peak and produces an output to be applied to gate 85.

Since it is presumed that a bottle 28 is in the inspection area, the light barrier 38–39 established by the lamp 39 has been interrupted and the monovibrator 50 has been triggered, so that in fact the gating circuit 85 is open. The output signal thus derivable from amplifier 85 triggers the driver stage 95, and contact or circuit 95a closes, and the reject mechanism 100 is actuated. Any further and any additional response by any other photocell, for example, such as photocell 48, over which the image of particle Z will travel after it has left the photoelectric receiver 45 remains ineffective, as far as reject control is concerned. Any background signals effective in any of the other channels will not influence this particular channel which triggered the reject mechanism.

It is an advantage of this system that the triggering of the reject mechanism 100 will always be initiated by only one channel, which is the channel that first detects the dirt particle. Since each photoelectric receiver, and particularly the momentary inspection area covered at any time by each particular photocell, is rather small as compared with the entire inspection circle 32, each individual channel receives very little background "noise." The detection of a particular dirt particle by any particular detecting channel is not obscured by the background eventually picked up by all the other channels, so that no summing up of background noise is obtained with this particular system.

The image of the dirt particle Z, when traveling over the photoelectric cell 48, produces the pulses as shown in FIG. 7b. The channel governed by the photoelectric receiver 48 does not influence the reject mechanism in this case, as stated, even though it furnishes a dirt-indicating pulse. However, the situation would be different if, for example, the inspection period would commence at the moment the particle Z travels over the photoelectric receiver 48. In this case, the gates 81 through 88 would be gated open while the image of the dirt particle travels across photocell 48, and particularly after the trailing edge of pulse 48a has been passed into the tuned circuit 78, driver 98 will respond to close the circuit 98a to trigger the reject mechanism 100.

In addition to the control of the apparatus 100 by the alternating current signal, a D.C. signal may also be utilized to control the reject apparatus 100. The signals derived from the photocells 41 through 48 are introduced to an adding circuit 60. Specifically, the circuit 60 adds the signals from the amplifier 51 through 58 and introduces the summed signal to a D.C. amplifier 70. The D.C. signal from the amplifier 70 is indicative of the level of the total light energy received by the photocell mosaic 10a. The D.C. signal is coupled from the amplifier 70 to a threshold circuit 80, which operates a flip-flop circuit 90 if the D.C. signal exceeds a predetermined value. The flip-flop circuit 90 is automatically set by monovibrator 50 when a bottle 28 is moved into the inspection zone. When the circuit 90 is set, a reject indication is provided, but the circuit 90 is reset by the D.C. signal from the threshold circuit 80. If a D.C. signal is not provided to the circuit 90, it functions to operate the reject apparatus 100 even though an A.C. signal is not furnished to any of the driver stages 91 to 98. The purpose of this measure is, for example, to cause rejection of a bottle whose bottom is covered by a light-impeding dust layer, without having individual dust particles. The A.C. system can cover only dust particles, but not dust layers.

In the embodiments of the invention described above in reference to FIGS. 1 through 6, a rotating prism 19 couples the light from an area which is considerably larger than the size of the particles to be detected. The embodiment of the invention shown in FIG. 8 provides for a faster detection of any particles because the entire field is continuously viewed, so that a particle is detected instantly. In the embodiment of the invention depicted in FIG. 8, a rotating prism 150 is provided which scans the total field 151 continuously and which provides for a nutating image of any particle of dirt in the field 151. The prism 150 has a bottom face 152 which is substantially parallel to the bottom of the bottle which is being inspected and, therefore, is parallel to the plane of the total field 151. The prism 150 also includes a second face 153 which extends at an acute angle to its longitudinal axis of rotation.

The light from the field 151 is focused through an objective lens 155, which may be rotated together with the prism 150. The objective lens 155 focuses the image of the field 151 on a photocell mosaic 157 which is stationary and positioned adjacent the angled face 153 of the prism 150. The mosaic 157 is larger than the image of field 151. The focal length of the objective lens 155 is quite small so that the sensitive surface of the photocell mosaic 157 is positioned relatively close to the prism 150.

As the prism 150 rotates, the image of any particle in the field 151 moves across the mosaic 157 to develop an alternating current signal. A particle, for example, in the center of the field 151 would provide for a concentric image across the surface of the mosaic 157, which has a radius determined by the slope of the face 153 of the prism 150. The angle in FIG. 10 is equal to one-half of the slope of the face 153. The mosaic 157 may have any number of photocells, two or more, and typically may have eight photocells, such as the photocell mosaic 10a described above. For reasons of simplification, again only four cells and detector channels are shown.

Due to the wobbling motion of the image of the total field 151 at the mosaic 157, an A.C. signal is developed adjacent the periphery of the sensitive surfaces of the mosaic 157. Since the surface of the mosaic 157 is at any instant larger than the image of the total field 151 focused thereon, the wobbling image still falls upon the surface 157 all the time. At any instant, therefore, a portion of the sensitive surface of the mosaic 157 does not receive any light from the field 151, so that individual signals are developed in each detector channel regardless of dirt. In order to cancel this cyclical signal, so that only the A.C. components due to the presence of particles in the field 151 remain, a tachometer generator 160 is utilized to provide a series of pulses having a repetition rate equal to the repetition rate of the pulses produced by the mosaic 157, due to the wobbling motion of the image of the total field 151. The repetition rate of the pulses produced by each of the photocells of mosaic 157 is equal to the speed of rotation of the prism 150.

The pulses from the tachometer 160 are introduced to a pulse generator 161, which provides phase-shifted pulses that are substantially the same in shape as the pulses developed by each photocell of the mosaic 157 due to the wobbling effect of the field image, but are 180 degrees out of phase relative thereto. The out-of-phase signals from the pulse generator 161 are introduced to a number of adding circuits 162, one for each of the photocells of the mosaic 157. The output of each of the adding circuits 162 is, accordingly, the signal developed by its associated photocell of the mosaic 157, including compensation for the wobbling motion of the field. The signals from the circuits 162 are, accordingly, D.C. signals in the absence of particles of dirt in the field 151. Any particles in the field 151 provide for a nutating image at the photocell mosaic 157 which crosses a number of the photocells of the mosaic to produce A.C. components as aforedescribed.

The signals from each of the adding circuits 162 are being processed individually by A.C. detector circuits 163, one for each detector channel. These A.C. detector circuits may include tuned circuits and amplifiers such as were described above in reference to FIG. 6.

FIG. 9 depicts an alternative design, particularly in comparison with that shown in FIG. 8. The motion of the image of a dirt particle in field 151 is here being produced by a Dove prism 158, which in fact reverses the sides of the image that is being produced. Upon rotation of the Dove prism 158, the image of the dirt particle in stationary field 151 will rotate across the stationary mosaic 157. In this embodiment, the lens 155, which primarily produces the image, may image the entire bottom of the bottle, defining the inspection field 151, onto the mosaic 157. Thus, in this case the entire inspection field is at all times observed by the entire mosaic, but the image of any dirt particle is being rotated by the rotating Dove prism 158, so that the image of a dirt particle will in fact travel across various photocells, thereby producing A.C. signals.

The evaluation circuit can be precisely the same as described in the embodiment of FIGS. 1 to 7. It should be mentioned that the embodiment of FIG. 8 has one deficiency in that a precisely circular dirt particle which is positioned so as to be exactly concentric or coaxial to the axis of rotation of the Dove prism 158 will develop no A.C. signal, for the image of such a centrally located dirt particle would not travel across the mosaic 157. During the inspection, however, bottle 28 will travel longitudinally on its conveyor in a direction which extends transversely to the axis of rotation so that, actually, even such a dirt particle will produce some A.C. signal components.

The invention is not limited to the embodiments described above, but all changes and modifications thereof not constituting departures from the spirit and scope of the invention are intended to be covered by the following claims.

What is claimed is:

1. In a system for inspecting a container for particles of foreign matter,
    energy means disposed relative to the container for illuminating the container with energy to provide a field of energy modulated by the characteristics of the container and any particle of foreign matter in the container,
    a plurality of energy-sensitive members disposed in spaced relationship to each other and to the energy means to receive the energy from the field,
    means disposed relative to the energy-sensitive members and to the energy means for sequentially directing the energy from progressive areas of the field of modulated energy to the energy-sensitive members where the area providing energy at any instant to any individual energy-sensitive member is substantially larger than the size of any particle in the container but smaller than said field so that each foreign particle modulates the energy provided for at least one of the energy-sensitive members,
    a plurality of electrical detector channels each connected to an individual one of the energy-sensitive members and each including separate amplifier means and each individually responsive to the signals from the associated energy-sensitive member for individually operating upon such signals to provide individual and distinguishable output signals indicating a foreign particle in the container in accordance with changes in the characteristics of the output signals,
    and rejection control means individually responsive to the signals from the electrical detector channels in the plurality to provide a rejection of the container in accordance with the signals individually produced by the electrical detector channels.

2. In a system for inspecting a container for particles of foreign matter,
    energy means disposed relative to the container for illuminating the container with energy to provide a field of energy modulated by the characteristics of the container and by any particles of foreign matter in the container;
    at least a pair of energy-sensitive members;
    adjustable means disposed relative to the energy means and the pair of energy-sensitive members for directing the energy from a portion of the field of energy to the pair of energy-sensitive members;
    means operatively coupled to the adjustable means for cyclically adjusting the adjustable means to sequentially direct the energy from different portions of the field to the pair of energy-sensitive members and to obtain a repetitive movement of the image of any particle in the container across at least one of the energy-sensitive members and to obtain the production of signals by the energy-sensitive members in accordance with the energy directed from the different portions of the field to the energy-sensitive members;
    at least two electrical means each including a separate alternating current amplifier and each respectively connected to an individual one of the energy-sensitive members and respectively responsive to the signals from the associated energy-sensitive member for operating individually upon such signals to respectively obtain separated and distinguishable output pulses having characteristics representative of the passage of any particle in the container across the associated energy-sensitive member, and
    reject control means having a plurality of independently responsive inputs respectively connected to the two electrical means providing for container rejection in accordance with the characteristics of the signals produced by the two electrical means.

3. In a system for inspecting a container for particles of foreign matter,
    energy means disposed relative to the container for illuminating the container with energy to provide a field of energy modulated by the characteristics of the container and any particle in the container,
    a plurality of energy-sensitive members disposed in spaced relationship to each other and to the energy means,
    means disposed relative to the energy-sensitive members and to the energy means for sequentially directing the energy from progressive areas of the field of modulated energy to the energy-sensitive members where each progressive area providing energy at any instant to any one of said energy-sensitive members is greater than the size of any particle and is smaller than the entire field to be inspected,
    a plurality of similar electrical circuitry means each individually connected to a different one of the energy-sensitive members in the plurality and each including separate alternating current amplifier means and each respectively responsive to the signals from the associated energy-sensitive member for operating upon such signals to indicate a foreign particle within the container in accordance with changes in the characteristics of any one of such signals; and
    reject control means connected to the electrical circuitry means in the plurality for rejecting the containers having particles of foreign matter in accordance with the characteristics of the individual signals produced by each of the similar electrical circuitry means.

4. In a system for inspecting a container for particles of foreign matter,
    means disposed relative to the container for illuminating the container to provide a field of light modulated by the optical characteristics of the containers and any particle in the container, a plurality of light-sensitive members disposed in spaced relationship to each other and to the illuminating means, means disposed relative to the light-sensitive members and to the illuminating means for sequentially directing the light from progressive areas of the field of modulated light to the light-sensitive members where the area providing light at any instant to any individual light-sensitive members is substantially larger than the size of any particle in the container but smaller than said field so that each particle of foreign matter modulates the light provided at any instant for only one light-sensitive member, a plurality of electrical detector channels each individually connected to a different one of the plurality of light-sensitive members and each including separate alternating current amplifier means and each individually responsive to the signals from the light-sensitive members for individually operating upon such signals to provide signals individually representative of the presence of a foreign particle in the container in accordance with changes in the characteristics of such signals, and rejection control means connected to the plurality of electrical detector channels and individually responsive to such channels for providing for a rejection of the container in accordance with the characteristics of the signals individually produced by each of the electrical detector channels.

5. In a system for inspecting a container for particles of foreign matter, the combination comprising:

means disposed relative to the container for illuminating the container to provide a field of light modulated by the optical characteristics of the container and any particle in the container;

a plurality of light-sensitive members disposed in spaced relationship to each other and to the illuminating means;

means disposed relative to the light-sensitive members and to the illuminating means for sequentially directing the light from progressive areas of the field of modulated light to the light-sensitive members where the entire area providing light to any individual one of said light-sensitive members is smaller than said field, a plurality of electrical detector channels each connected to an individual one of the light-sensitive members and each including separate alternating current amplifier means and each responsive to the signals from the associated light-sensitive member for operating upon such signals to provide an individual output signal indicating a foreign particle in the container in accordance with changes in the characteristics of the output signal; and container reject control means connected to said detector channels and responsive to changes in the characteristics of the output signals individually produced by each of said detector channels upon the presence of a foreign particle to provide a signal for a container rejection.

6. In a combination for sensing the presence of foreign particles in a container having a bottom wall defined by a center and periphery, first means disposed relative to the container for directing energy toward the container, a plurality of separated second means disposed relative to the container for individually sensing a portion of the energy passing from the container, rotatable means disposed relative to the container and the first and second means for directing the energy in succession from the first means to the plurality of second means along progressive segments of the bottom of the container, where the progressive segments include the center of the bottom of the container and progressive portions of the periphery of the container and where the total area observed by any one of said plurality of second means is smaller than the area defined by the bottom of the container;

means operatively coupled to the rotatable means for rotating the rotatable means at a particular speed;

a plurality of third means, each connected to a different one of the separated second means in the plurality and each including separate alternating current amplifier means and each being individually responsive to the energy passing to the associated one of said second means from the container and the rotatable means for indicating the presence of foreign particles in the container in accordance with the occurrence of alternating characteristics in such energy at progressive instants of time; and means individually connected to said plurality of third means and individually responsive to the alternating characteristics of the energy from each of such third means for providing an indication as to the occurrence of foreign particles in the container.

7. In an inspection system for detecting the presence of a particle in a container having a center and a periphery, means disposed relative to the container for illuminating the container with light, first and second light-responsive means for converting light to an electrical signal;

rotatable light-refracting and directing means for sequentially and cyclically coupling the light from different areas of the container to said first and second light-responsive means, where the areas having light momentarily coupled to said first and second light-responsive means at any instant are substantially larger than the particle to be detected and only one of said areas at any instant includes the center of the container;

first and second circuit means each respectively and individually coupled to a different one of said first and second light-responsive means and each including separate alternating current amplifier means for individually detecting signals having alternating characteristics indicative of the presence of a particle in the container; and means individually coupled to said first and said second circuit means for indicating the presence of a particle in the container in accordance with the alternating characteristics of the signals individually receved from at least one of the first and second circuit means.

8. In an inspection system for detecting particles in a container having a center and a periphery, means rotatable on a center for providing a nutating inspection field which at successive instants observes progressive portions of the area of the container to be inspected and which is modulated by the radiant energy transmission characteristics of said container and of particles in said container;

reject control means having a plurality of independently responsive inputs to provide for container rejection upon an introduction to any of its inputs of a signal having alternating characteristics;

a plurality of circuit means each including separate alternating current amplifier means and each individually responsive to the modulated radiant energy from a different area within said nutating inspection field to convert the radiant energy modulated in said area to individual electrical signals having alternating characteristics for each particle in said container; and means operatively and individually coupled to the circuit means in the plurality and to the inputs in the reject control means for individually processing said signals and introducing these signals to the individual inputs of said reject control means to provide for container rejection in accordance with the production of a signal having alternating characteristics.

9. In combination for sensing the presence of foreign particles in a container having a bottom wall defined by a center and a periphery;

first means disposed relative to the container for directing energy toward the container;

a plurality of second means disposed relative to the container for individually sensing portions of the energy passing from the container;

rotatable means disposed relative to the container and the first means and the plurality of second means for passing toward each of said second means the energy in succession from different and progressive segments of the container where all the progressive segments define in succession the bottom of the container and result from the rotation of the rotatable means and where the center of rotation of the rotatable means is disposed within the area defined by the bottom of the container;

means operatively coupled to the rotatable means for obtaining a rotation of such rotatable means;

reject control means having a plurality of independently responsive inputs to provide for container rejection upon an introduction to any of its inputs of a signal having alternating characteristics; and a plurality of third means each individually connected to a different one of the inputs in the reject control means and responsive to the energy received by the associated one of the second means and each including separate alternating current amplifier means to produce signals having alternating characteristics upon the occurrence of a foreign particle in the container.

10. In a system for inspecting a container for particles of foreign matter, a source disposed relative to the container for directing energy to the container to provide an energized field for inspection, at least a pair of stationary sensitive surfaces constructed to receive energy and to produce signals having characteristics dependent upon the characteristics of the received energy, a prism disposed relative to the container and the pair of sensitive surfaces and rotatable to direct energy at successive instants of time from the energized field to said sensitive surfaces so that the sensitized surfaces receive energy from different and progressive areas of the energized field, a pair of means each connected to a different one of the sensitive surfaces and each including separate alternating current amplifier means and each individually responsive to the signals produced by the associated one of the sensitive surfaces for operating upon such signals to produce individual output signals having particular characteristics representing the occurrence of a particle of foreign matter in the container, and reject control means individually connected to each of the pair of last mentioned means to receive output signals independently and sequentially from each of such pair of last mentioned means and to provide an indication as to the occurrence of a particle of foreign matter in the container upon the occurrence of output signals having the particular characteristics.

11. In a system for inspecting a container for particles of foreign matter, a source for providing radiant energy through the container to form a beam of radiation modulated by any particles in the container;

a plurality of radiation-responsive means, a rotatable member for cyclically and sequentially coupling different portions of the modulated beam to different ones of said responsive means, means operatively coupled to the rotatable member for obtaining a rotation of the rotatable member, a plurality of first circuit means each electrically coupled to a different one of the radiation-responsive means in the plurality for individually and sequentially producing signals in accordance with the characteristics of the radiant energy passing to the associated radiation-responsive means at each instant of time; and second circuit means electrically coupled to said plurality of first circuit means for providing an output indication representing the occurrence of a foreign particle in the container upon the production of signals with particular characteristics by at least one of the first circuit means in the plurality.

12. In combintaion for sensing the presence of foreign particles in a container having a bottom wall defined by a center and a periphery, first means disposed relative to the container for directing energy toward said bottom wall of the container, a plurality of second means disposed relative to the container for individually sensing a portion of the energy passing from the container, rotatable means disposed relative to the container and the first and second means for passing the energy in succession from the first means to said plurality of second means and in progressive segments to each of said second means where at least one segment at a time includes a portion of the periphery of said bottom wall and at least one segment concurrently includes the center of said bottom wall of the container, a plurality of third means each connected to a different one of the second means in the plurality for producing an output signal having alternating characteristics representative of the characteristics of the energy sensed by the associated one of the second means upon the occurrence of a foreign particle in the container; and container reject control means connected to the plurality of third means and responsive to the production by at least one of said third means of a signal with alternating characteristics to provide an indication as to the occurrence of a foreign particle in the container.

References Cited by the Examiner

UNITED STATES PATENTS

| 3,081,666 | 3/1963 | Calhoun et al. | 88—14 |
| 3,115,970 | 12/1963 | Husome | 209—111-7 |
| 3,123,715 | 3/1964 | Husome | 29—111-7 X |
| 3,191,773 | 6/1965 | Wyman | 29—111-7 |

M. HENSON WOOD, JR., *Primary Examiner.*

ALLEN N. KNOWLES, *Examiner.*